April 9, 1957 H. H. HOLLY 2,787,808
PATTY MOLDING DEVICES
Filed June 28, 1954 8 Sheets-Sheet 1

Inventor:
Harry H. Holly,
By Schroeder, Hofgren, Brady
and Wegner Attys.

April 9, 1957
H. H. HOLLY
2,787,808
PATTY MOLDING DEVICES
Filed June 28, 1954
8 Sheets-Sheet 2
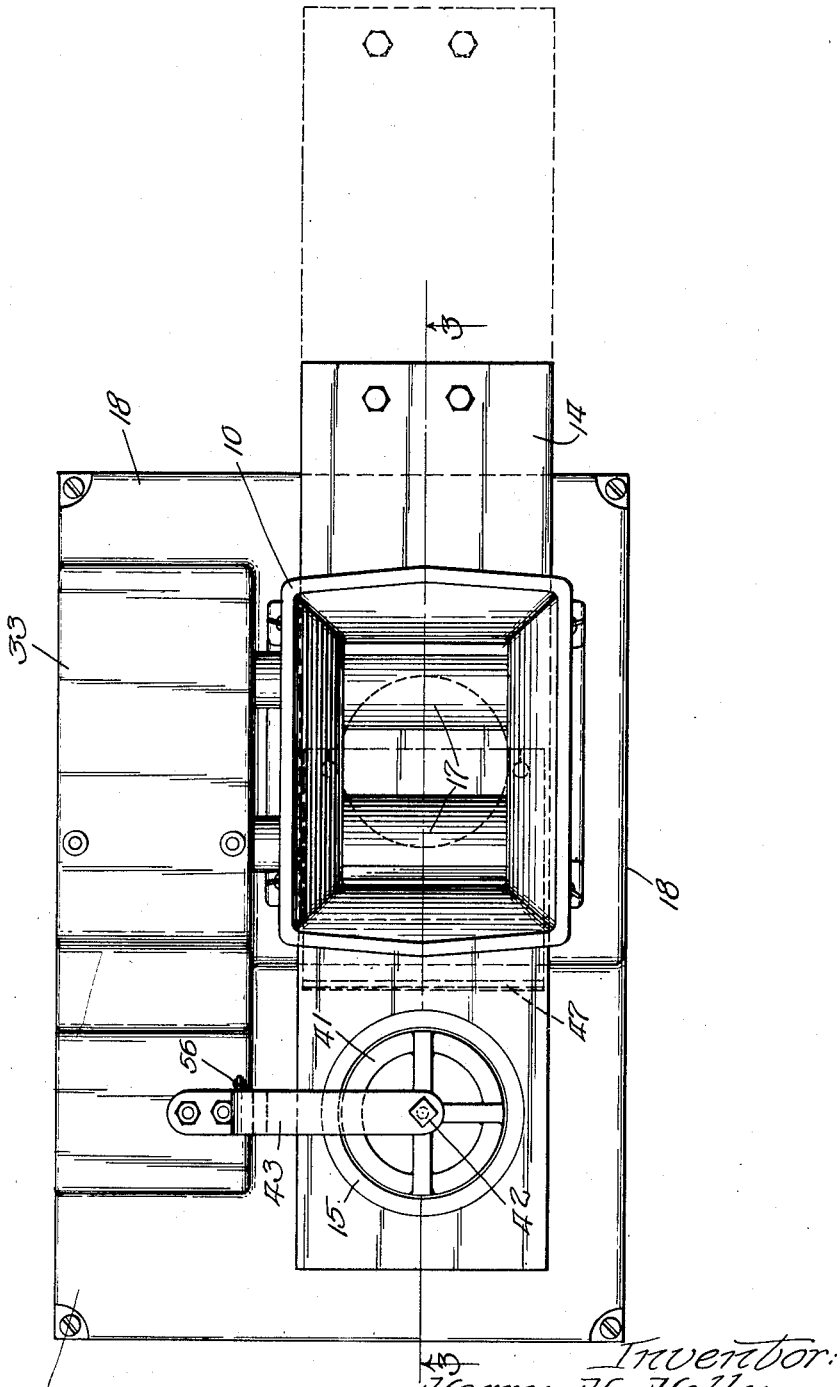

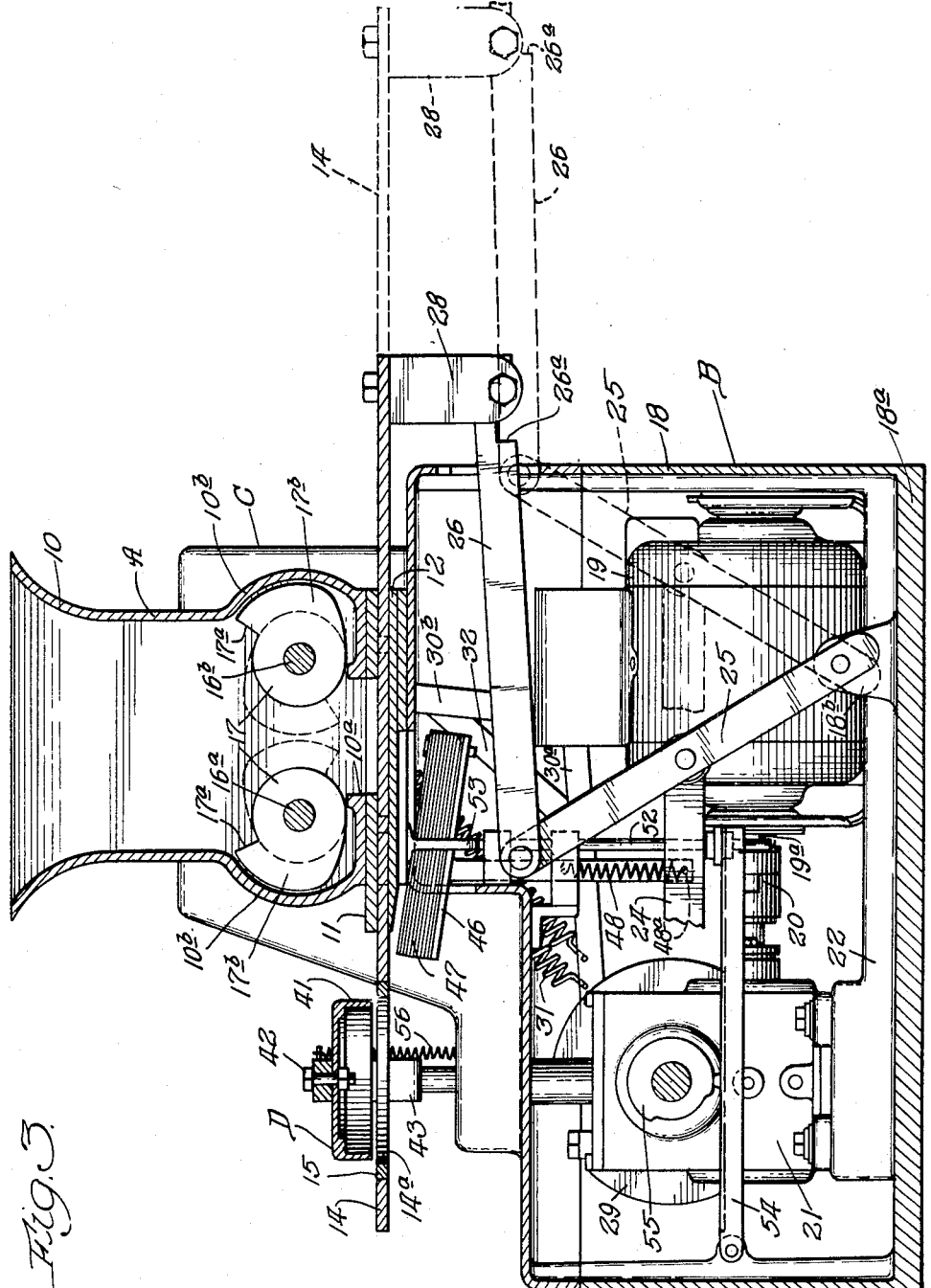

April 9, 1957
H. H. HOLLY
2,787,808
PATTY MOLDING DEVICES
Filed June 28, 1954
8 Sheets-Sheet 4
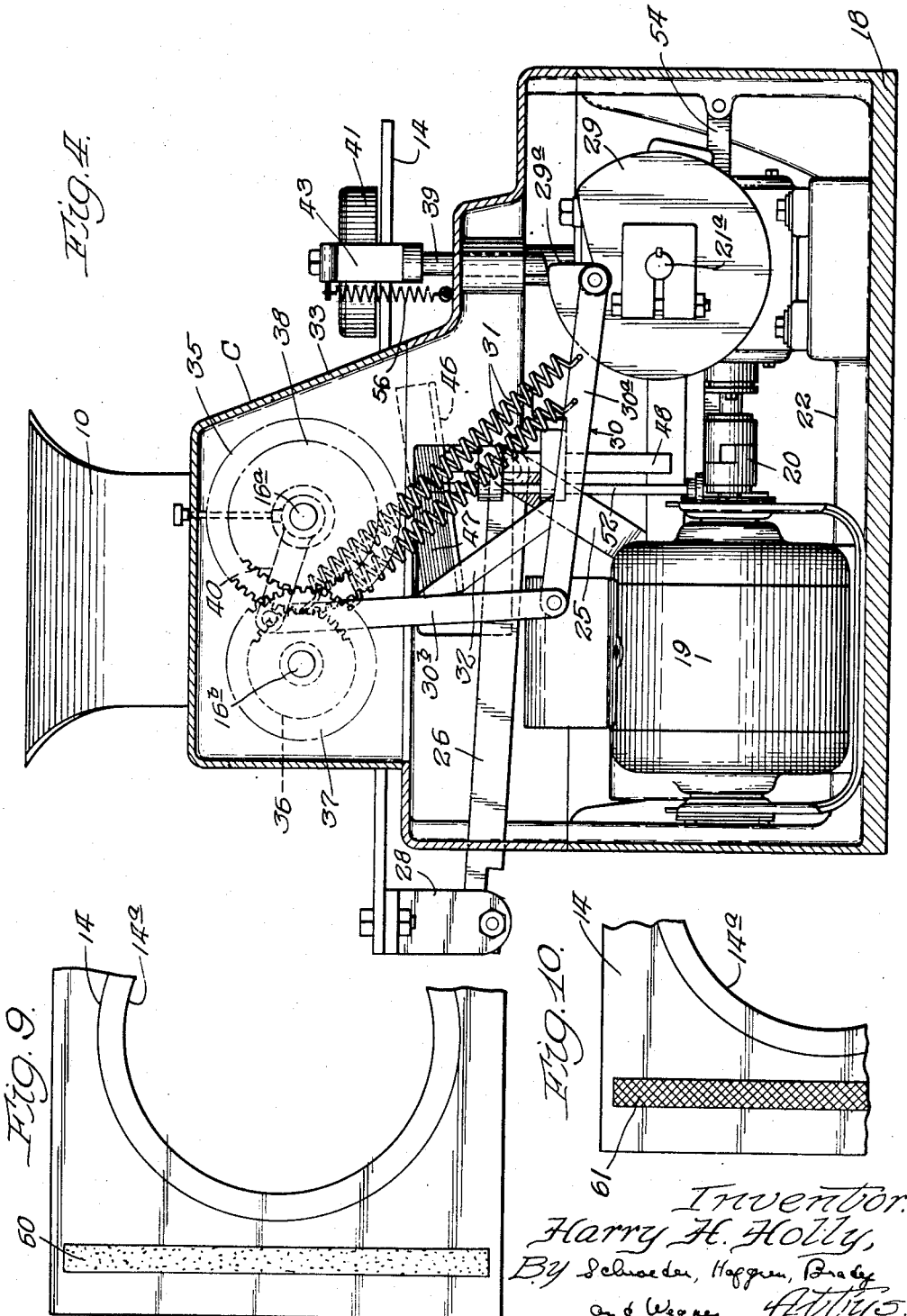
Inventor.
Harry H. Holly,
By Schroeder, Hofgren, Brady
and Wegner Attys.

April 9, 1957　　　　　H. H. HOLLY　　　　　2,787,808
PATTY MOLDING DEVICES
Filed June 28, 1954　　　　　　　　　　　　　　　8 Sheets-Sheet 5
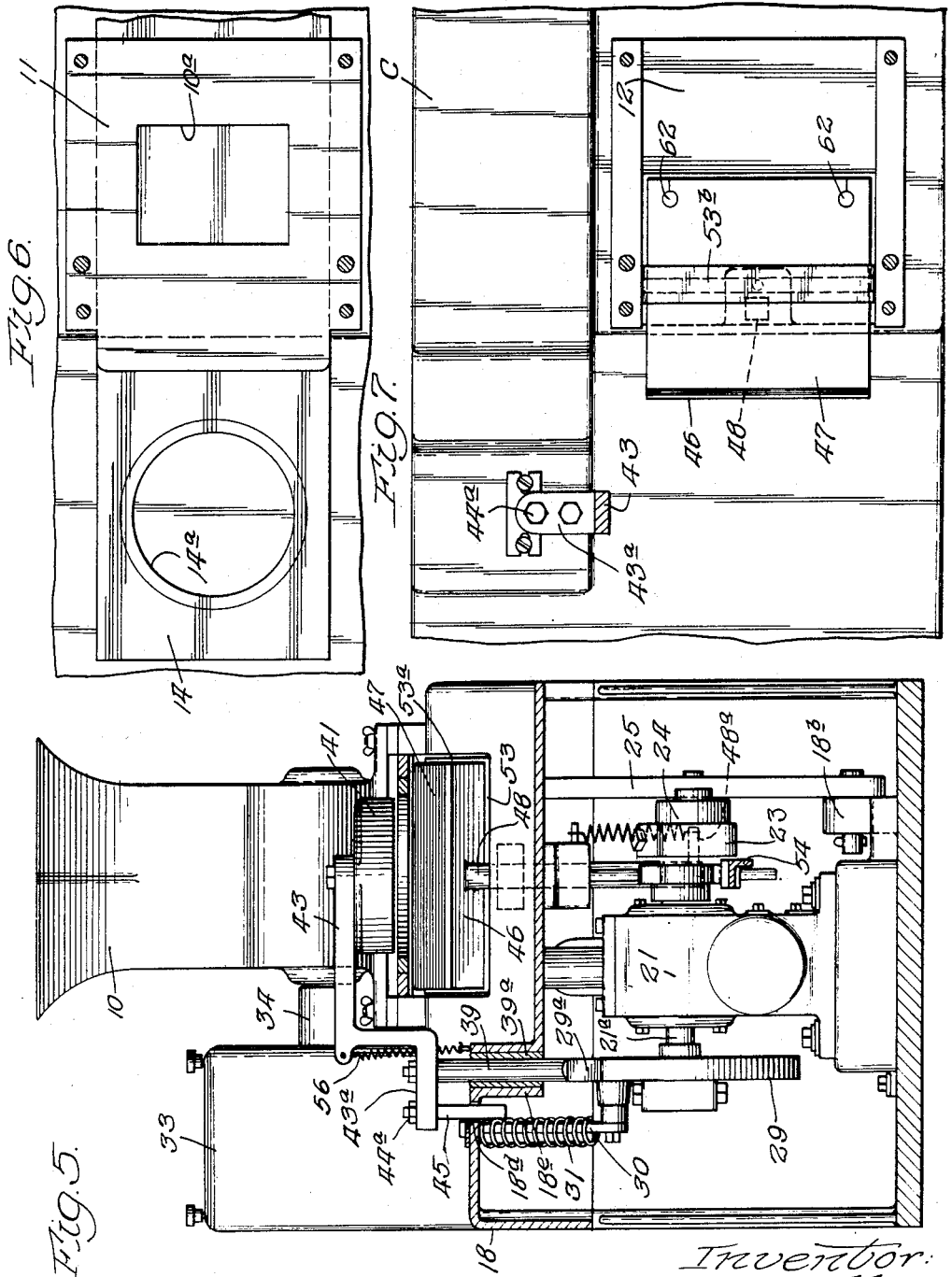

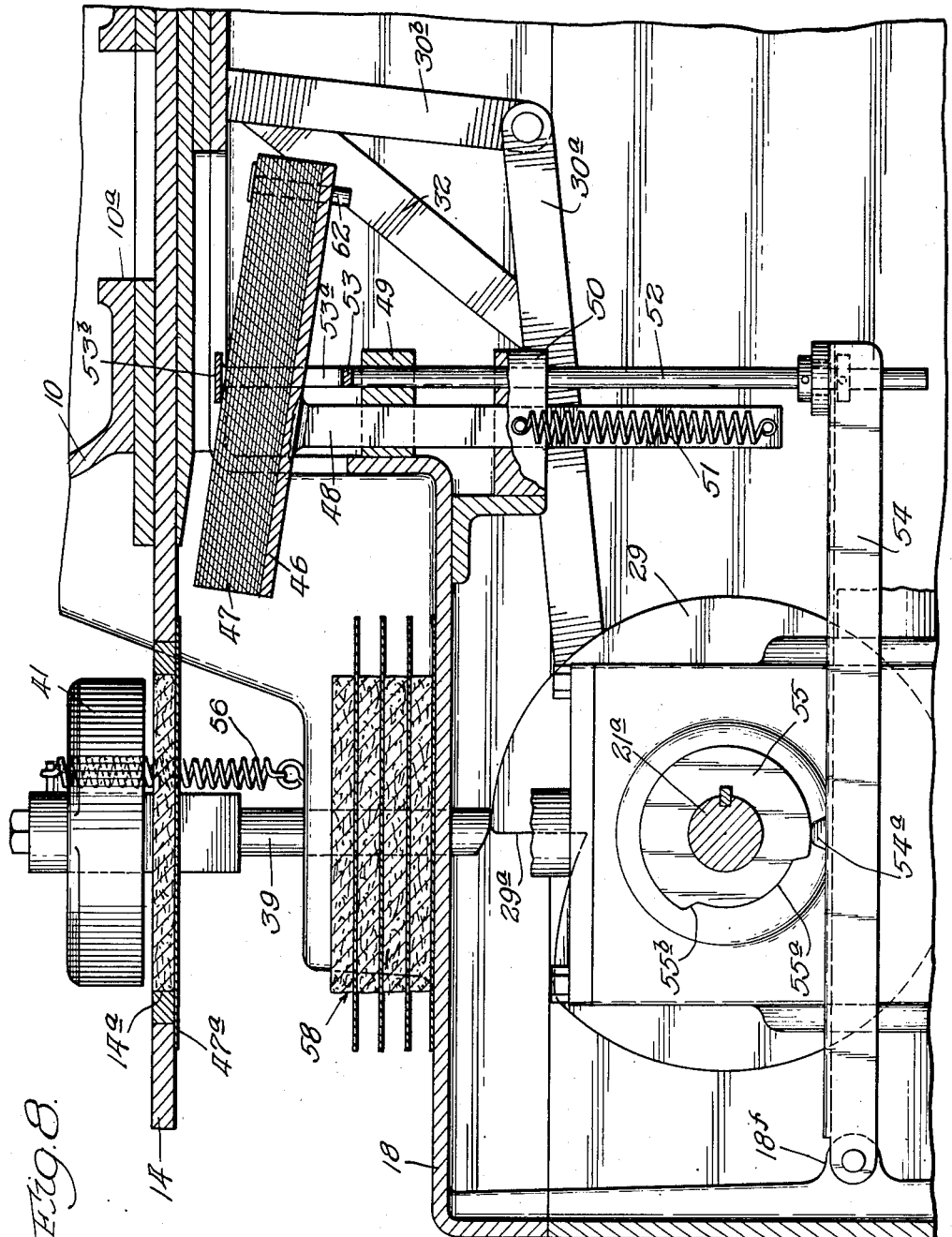

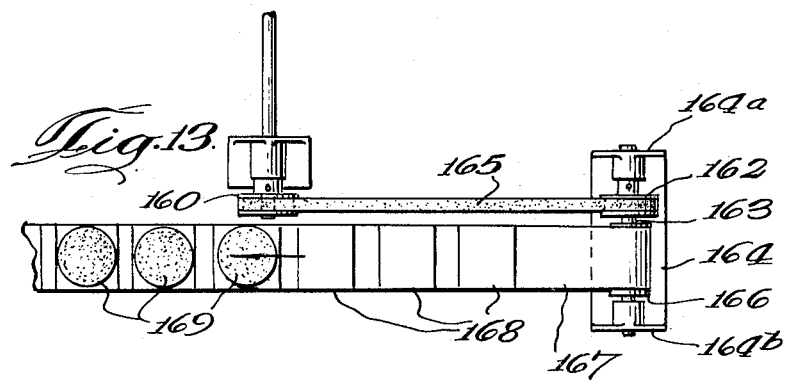
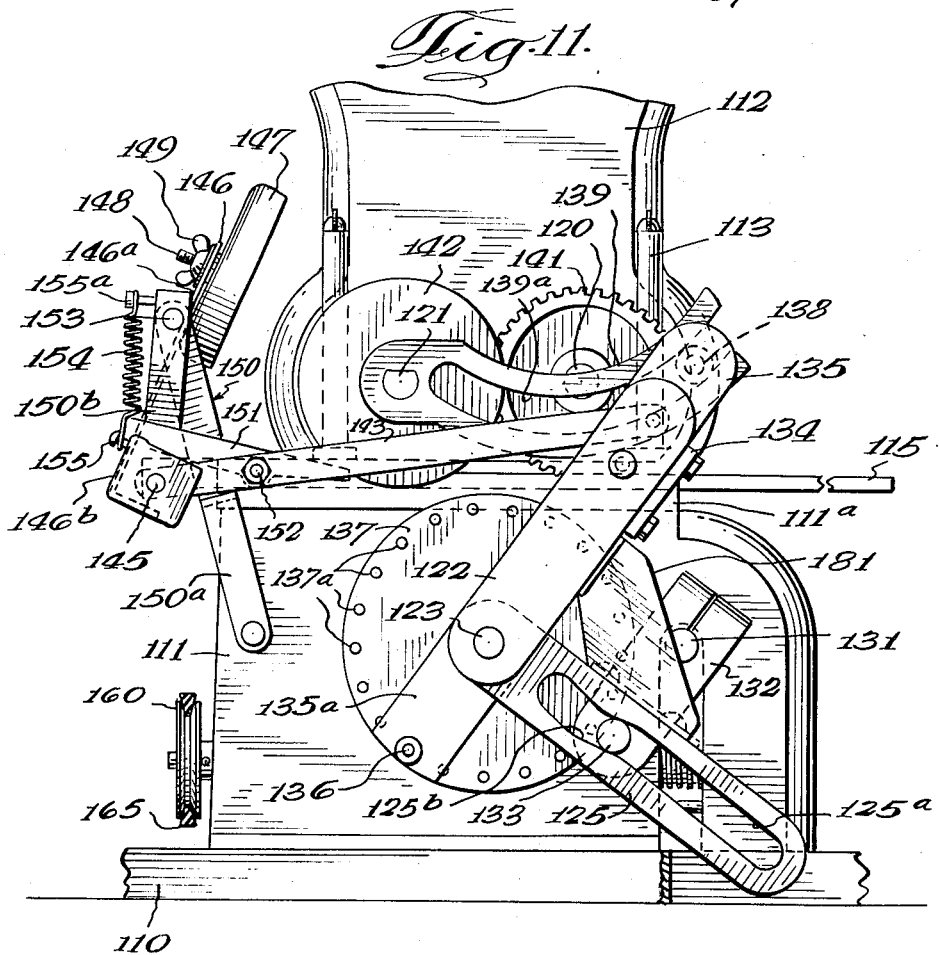

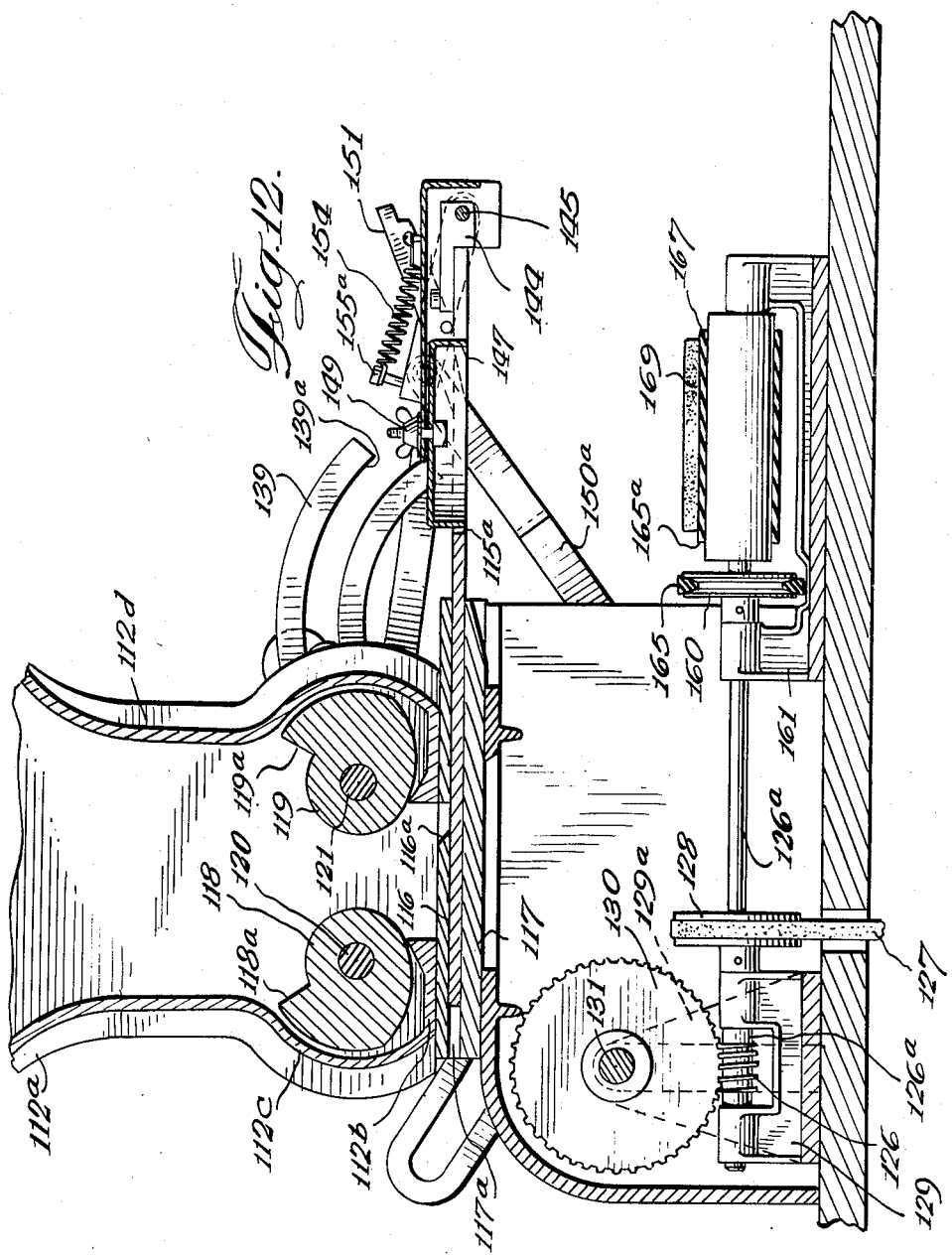

United States Patent Office 2,787,808
Patented Apr. 9, 1957

2,787,808

PATTY MOLDING DEVICES

Harry H. Holly, Chicago, Ill., assignor to Hollymatic Corporation, a corporation of Illinois Application June 28, 1954, Serial No. 439,515

8 Claims. (Cl. 17—32)

This invention relates to a device for molding a patty from plastic material.

This application is a continuation-in-part of my co-pending application, Serial No. 185,243, filed September 16, 1950, now U. S. Patent 2,684,501, dated July 27, 1954, which in turn was a continuation-in-part of application Serial No. 82,420, filed March 19, 1949, now Patent 2,530,062, dated November 14, 1950.

One of the features of this invention is to provide, in a device for molding a patty from plastic material, apparatus comprising a mounting means, a source of plastic material operatively carried by the mounting means having an exit therefrom, a mold movable relative to said exit operatively carried by the mounting means including a shaping cavity having substantially the shape and dimensions of said patty for shaping the patty in its final form, apparatus operatively carried by the mounting means and operatively engaging the mold for moving the mold until the cavity is in communication with the exit to receive material therefrom and then moving the mold to a discharge position spaced from said exit, and apparatus operatively carried by the mounting means for removing the formed patty from the mold opening and from the device without substantial further shaping of said patty.

Another feature of the invention is to provide, in a device for molding a patty from plastic material, apparatus comprising a mounting means, a hopper for the plastic material operatively carried by the mounting means, a reciprocable mold plate operatively carried by the mounting means adjacent to the hopper including a mold opening having substantially the shape and dimensions of said patty for shaping the patty in its final form, apparatus operatively carried by the mounting means engaging the mold plate for moving the mold plate relative to the hopper from a position where the mold opening is in communication with the hopper to receive plastic material therefrom to a discharge position where the opening is spaced from said hopper, a knock-out member operatively carried by the mounting means adjacent to the discharge position of the mold plate, apparatus operatively carried by the mounting means operatively engaging the knock-out member for causing the member to enter said opening and remove the formed patty therefrom when the plate has reached said discharge position, and a supporting member adjacent to said discharge position for receiving said patty, the supporting member being adapted releasably to support a separator sheet for said patty.

Other features and advantages of the invention will be apparent from the accompanying drawings and the description of one embodiment of the invention. Of the drawings:

Fig. 2 is a plan view of the device of Fig. 1 showing in dotted lines one extreme position of the mold plate.

Fig. 3 is a vertical section taken substantially along line 3—3 of Fig. 2.

Fig. 4 is a side elevation of the device taken opposite the side shown in Fig. 3 and with a side plate removed.

Fig. 5 is a section taken substantially along line 5—5 of Fig. 1.

Fig. 6 is a section taken substantially along line 6—6 of Fig. 1.

Fig. 7 is a section taken substantially along line 7—7 of Fig. 1.

Fig. 8 is an enlarged detailed fragmentary section somewhat similar to Fig. 3 and illustrating the feeding mechanism for the separator sheets.

Fig. 9 is a fragmentary bottom view of the mold plate adjacent the mold opening and illustrating an alternate embodiment of the invention.

Fig. 10 is a view similar to Fig. 9 but showing a second alternate embodiment of the invention.

Fig. 11 is a fragmentary side elevation of another embodiment of the device of this invention with a side plate removed at the bottom thereof to expose portions of the driving mechanism.

Fig. 12 is a fragmentary side elevational view partially in section of the device of Fig. 11.

Fig. 13 is a fragmentary plan view of the patty transfer device of the embodiment of Fig. 12, shown to a reduced scale.

Figure 1:
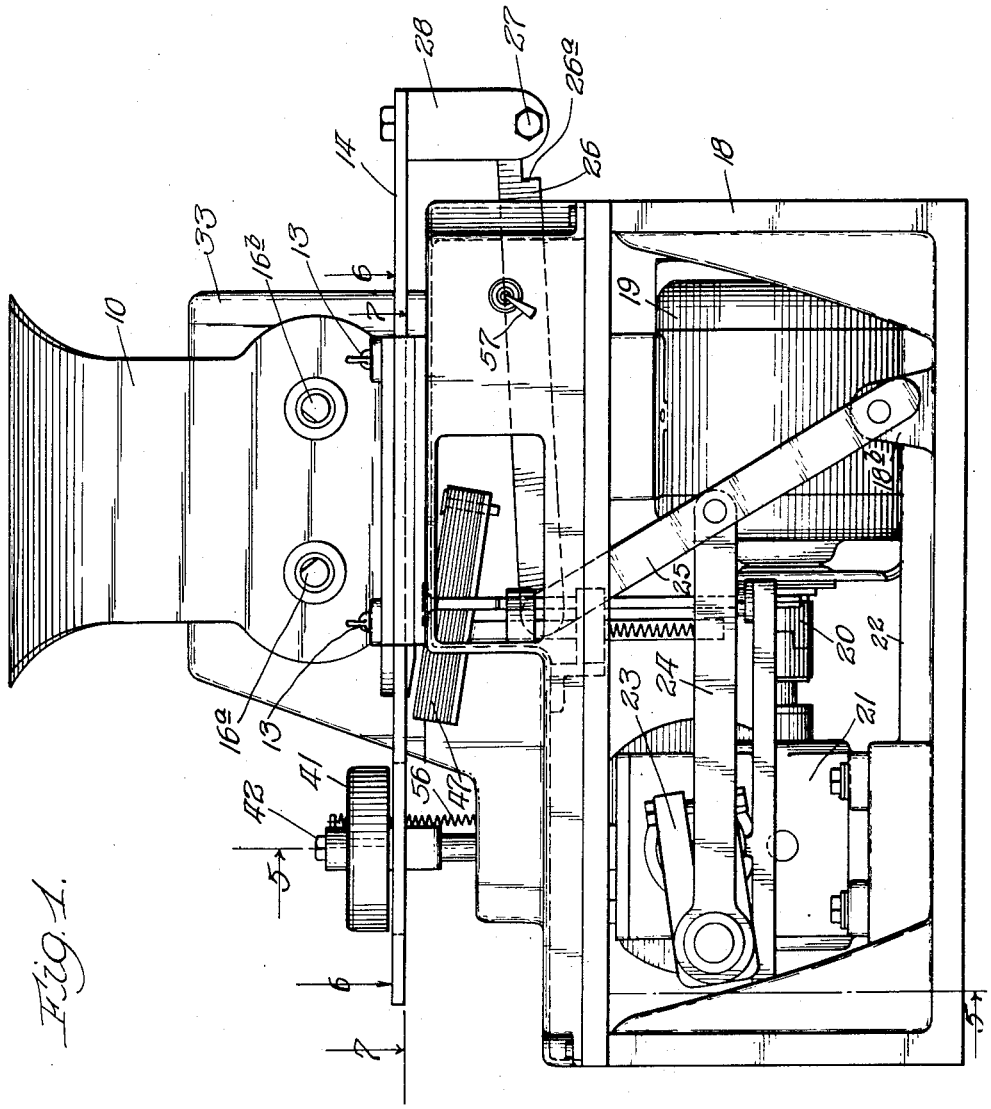
Fig. 1 is a side elevation of a molding device illustrating one embodiment of the invention.

The molding device shown in Figs. 1–10 of the accompanying drawings is similar to that described and claimed in my application Serial No. 82,419, filed March 19, 1949, now Patent No. 2,530,061, issued November 14, 1950, which discloses and claims the apparatus illustrated herein for forcing the plastic material from the hopper into the mold opening. The apparatus for removing the molded patty from the mold opening in this device is described and claimed in my application Serial No. 82,420, filed March 19, 1949, now Patent No. 2,530,062, issued November 14, 1950. The device illustrated in Figs. 1–10, however, employs a different type of feed for the paper separator sheets and this portion of the device is the subject of the present invention.

The molding device shown in Figs. 1–10 comprises a hopper and feed portion A, a bottom portion B housing the driving mechanism, a gear case C mounted on the bottom portion B and arranged at one side of the hopper and feed portion A, and a transfer portion D located on the bottom portion B and in front of the hopper and feed portion A.

The hopper and feed portion A comprise a hopper 10 adapted to contain a relatively large quantity of plastic material such as ground meat and having a bottom opening 10a with the hopper being mounted on a supporting plate 11, which in turn, is held on a base 12 by wing nuts 13. The supporting plate 11 and base 12 have their central portions spaced from each other to provide room for a slide plate 14 arranged therebetween. The slide plate 14 has ends extending considerable distances beyond the corresponding ends of the plate 11 and the base 12.

The hopper 10, supporting plate 11, and base 12 may be easily assembled and disassembled for cleaning as explained more fully in my above mentioned Patents 2,530,061 and 2,530,062.

The slide plate 14 is provided with a mold opening 14a for receiving plastic material that is forced from the hopper through the opening 10a. As shown in Fig. 3 the mold opening 14a is an opening in an annular plate 15 held in the slide plate 14. The plate 14 serves not only as a mold but also as a part of the transferring apparatus for transferring a portion of the plastic material from the mold.

The sides of the hopper 10 are provided at two opposite sides thereof with the rounded portions 10b, each having the shape of a section of a cylinder. These rounded portions are located adjacent the bottom of the hopper 10 and on opposite sides of the hopper opening 10a. Located within the mold 10 are a pair of rotatable axles 16a and 16b arranged substantially parallel to each other and above and on opposite sides of the hopper opening 10a. Mounted on each axle 16a and 16b is a feeder 17, these feeders being rotatable with the axles 16a and 16b. Each feeder is provided with a ram portion 17a located on the periphery of the feeder. Each ram portion comprises a flat section that substantially coincides with the radius of a feeder 17. The outer surface of each feeder is substantially circular for a distance greater than 180° beginning at the base of a ram portion 17a. The surface opposite the ram portion extends away from the center of the feeder and is curved to provide a protuberance 17b. As shown in Fig. 3, each protuberance is located within a rounded portion 10b when the feeder is in position with the ram portion 17a at substantially its greatest distance from the hopper opening 10a.

The bottom portion B of the molding device houses the major portion of the driving mechanism. This bottom portion is provided with a casing 18 including a bottom plate 18a. Mounted on this bottom plate is a motor 19 having a shaft 19a attached through a flexible coupling 20 to the shaft of a gear reducer 21. This gear reducer is mounted on a support 22 which in turn is mounted on the bottom plate 18a. The support 22 also serves to support a motor 19.

The gear reducer 21 is provided with a shaft 21a to which is attached a drive member 23 for rotation therewith. One end of the drive member 23 is rotatably attached to one end of an arm 24. The other end of the arm 24 is rotatably attached at substantially the midpoint of a second arm 25. This second arm has one end rotatably attached to a bracket 18b that is mounted on the bottom plate 18a. The other end of the arm 25 is rotatably attached to one end of a third arm 26 with the opposite end of this third arm being provided with a notched portion 26a on the bottom thereof which rests on and is in engagement with a bolt 27 located adjacent the bottom of a downwardly extending bracket 28 attached to the rear end of the slide plate 14. This notched portion 26a provides a lost motion connection between the third arm 26 and the slide plate 14.

The end of the gear reducer shaft 21a then opposite the end on which the drive member 23 is mounted has attached thereto a rotatable circular cam plate 29. This cam plate is provided with a depression such as a relatively deep notch 29a on one portion of its periphery. A linkage member 30 formed of two legs 30a and 30b is provided with one end of both legs being rotatably attached together and the opposite end of one leg 30a rotatably attached to the cam plate 29 at a point adjacent the bottom of the notch 29a. The opposite end of the other leg 30b extends up into the gear case C. The two legs 30a and 30b are urged together by a pair of relatively heavy coil springs 31 arranged substantially parallel to each other and having their ends attached at spaced points on the legs 30a and 30b. Means are provided for limiting the extent of movement of the legs 30a and 30b toward each other. As shown in Fig. 3, this limiting means comprises a stop member bar 32 attached to one leg 30b and extending to a point where its other end is abutted by the other leg 30a. The gear case C is provided with a removable housing 33 spaced from the hopper 10. The axles 16a and 16b extend through the side of the hopper 10 and into the housing 33. Each axle is separable at a point between the hopper 10 and housing 33 and is held together by an annular connector 34. There is provided a first gear 35 within the housing 33 and mounted for rotation on the axle 16a. This gear 35 is located adjacent the wall of the housing that is adjacent the hopper 10; also within the housing there is provided a second gear 36 mounted on the other axle 16b for rotation therewith. The first gear 35 meshes with the second gear 36, and the first gear has a circumference that is considerably greater than the circumference of the second gear. Mounted on the same axle 16b is a third gear 37. This third gear is positioned adjacent the side of the housing that is the furthest from the hopper 10. The third gear 37 which has a diameter larger than the second gear 36 meshes with a fourth gear 38 that is of substantialy the same diameter as that of the third gear 37. This fourth gear 38 is mounted on the axle 16a which holds the gear 35. This fourth gear 38 is rigidly fixed on the axle 16a for rotation therewith.

Attached to the axle 16a is a lever 40 with the outer end of this lever being attached to the upper end of the leg 30b of the linkage member 30. When the ram portions 17a are in the position shown in Fig. 3 this lever will extend upwardly and at a small angle to the horizontal, as is shown in Fig. 4.

When the slide plate 14 is moved to a position so that the opening 14a is beneath the hopper opening 10a, this mold opening is filled with the plastic material from the hopper 10. The slide plate is then moved to the position shown in Fig. 3. In order to remove the portion of plastic material from within the mold opening 14a, there is provided a transferring apparatus D. As shown, this apparatus comprises a knock-out member 41 of substantially circular shape normally positioned above the mold opening 14a, as shown in Fig. 3. This knock-out member is preferably of the same shape as the mold opening. The member 41 is connected by means of a bolt 42 to the end of an overhanging lever arm 43. The lower end of the arm 43 is provided with a horizontal portion 43a which is attached by means of a bolt 44a to a downwardly extending substantially square leg 45, which in turn extends through an opening 18d in the top of the casing 18. This leg 45 serves to guide the vertical movement of the arm 43 and the attached knock-out member 41. The arm 43 and knock-out member are urged in a downward direction by resilient means such as coil spring 56. This spring has one end attached to the lever arm 43 and the other end attached to the top of the casing 18.

In order to cause vertical movement of the lever arm 43 and thus the knock-out member 41, there is provided an actuating member 39 attached to the arm portion 43a. This actuating member 39, as shown, is a vertical rod that is slidably held in a bearing 39a located in an enlarged portion 18e of the casing 18. The bottom of the actuating member 39 rests against the periphery of the cam plate 29. The cam plate with its notch 29a serves as a timing device for operating the actuating member 61.

The device shown in the drawings is so proportioned that when the slide plate is in position shown in the drawings, the feeders 17 are turned back to a position where the ram portions 17a are furthest from the opening 10a and the arms 24, 25 and 26 are moved to the left, as shown in Fig. 3. In this position the actuating member 61 is just ready to drop down in the notch 29a on the further movement of the cam plate in a counterclockwise direction as viewed in Fig. 4.

The apparatus for applying a separator sheet to the molded patty is shown most clearly in Fig. 8. As shown, this apparatus comprises a supporting platform 46 on which is arranged a stack 47 of separator sheets 47a, such as sheets of grease resistant paper. The platform 46 and stack 47 are arranged at an angle to the mold plate 14 so that the edge of the stack that is nearest the bottom of the plate 14 is adjacent the knock-out member 41 of the removing means. The platform 46 is mounted on the upper end of a vertically movable rod 48 which is slidably held in spaced brackets 49 and 50.

This movable rod 48 is constantly urged upwardly by a coil spring 51 attached to the lower bracket 50 and an outwardly extending arm 48a on the bottom of the rod 48.

In order to control the operation of the platform 46 and stack 47, there is provided a second upwardly extending rod 52 also slidably held in brackets 49 and 50. This second rod 52 has its bottom end extending beneath the bottom of the first rod 48. The upper end of this second rod 52 is provided with a yoke-shaped member 53 having side arms 53a extending around the sides of the platform 46 and stack 47 and a top portion 53b engaging the top of this stack.

The bottom portion of the second rod 52 beneath the bottom end of the first rod 48 may be loosely attached to one end of an arm 54 in any conventional way as indicated at 54c in Fig. 8. This arm 54 extends laterally of the second rod 52 and has the opposite end pivotally attached to a bracket 18f provided on the inner surface of the casing 18.

This arm 54 passes between the drive member 23 and the gear reducer 21 and immediately beneath the gear reducer shaft 21a. Mounted on this shaft between the gear reducer 21 and the drive member 23 is a cam plate 55 locked to this shaft for rotation therewith. As shown in Fig. 8, the major portion of this cam has a circular periphery. For slightly more than 90° of the cam 55 this periphery is provided with an arcuate depressed portion 55a. The cam plate 55 has it periphery in engagement with an upwardly extending knob 54a of the arm 54. This knob and the depressed portion 55a of the cam each have inclined sides so that the top will readily ride on the peripheral surface of the cam plate 55.

As the mold plate 14 moves back and forth between the hopper 10 and the knock-out member 41, the cam plate 55 is rotated in timed relationship with this movement. When the mold opening 14a moves from the hopper 10 to a point adjacent the nearest edge of the stack 47 of separator sheets, the knob 54a enters the first part 55b of the depressed portion 55a of the cam plate 55. This permits the rods 48 and 52 to move upwardly under the urging of spring 51 so that the nearest edge of the topmost sheet 47a of the stack 47 contacts the bottom of the mold plate 14 slightly ahead of the mold opening 14a. The bottom of the mold plate 14 having an adherent surface portion adjacent the mold opening, causes this topmost sheet to stick to the bottom of the mold plate. As the mold plate continues its movement toward the position shown in Fig. 8, this topmost sheet is drawn from the stack and the nearest edge of the stack causes the sheet to be pressed against the bottom of the mold plate and across the mold opening 14a, as shown in Fig. 8. As soon as this action has been completed, the cam plate is in position so that it forces the arm 54 downwardly to move the stack 47 and platform 46 downwardly to the position shown in Fig. 8. The mold plate is then in position for the removal of the patty from the mold opening and for return movement to place the mold opening again in communication with the hopper. The second rod 52 has the important function of not only raising and lowering the platform and stack but also maintaining an equal spacing of the topmost sheet of the stack from the mold plate irrespective of the thickness of the stack. This is true because the spring 51 always urges the top of the stack into engagement with the top portion 53b of the yoke 53. As individual sheets are removed from the stack the topmost sheet at all times is urged against the top portion 53b so that even though the platform itself is moved upwardly, the topmost sheet on the stack will always be at the same spacing from the mold plate 14.

In operating the device, the hopper 10 is filled with a plastic material such as ground meat, the electrical circuit to the motor 19 is closed by operating the switch 57. The motor 19 causes the cam plate 29 to rotate counterclockwise as shown in Fig. 4, thus dropping the actuating member 39 into the notch 29a. The dropping of the actuating member causes the knock-out member 41 to be pulled sharply downwardly under the urging of spring 46. The knock-out member enters the mold opening 14a and dislodges the portion of plastic material that is held therein so that the plastic material, such as ground meat with the adhered separator sheet 47a falls onto the top of the casing 18 to form a stack 58 of patties, each separated by a sheet 47a. Further movement of the cam plate 29 causes the actuating member 39 to raise the knock-out member 41 from the mold opening. Further operation of the motor 19 rotates the driving member 23 and urges arms 24, 25 and 26 to the right, as shown in Figs. 1 and 3. The notch 26a in the outer end of arm 26 provides a lost motion connection so that there is a period during which the plate 14 is not moved. This period is sufficient for the knock-out member 41 to be raised from the mold opening 14a. As the drive member 23 continues to rotate, the arms 24, 25 and 26 are forced rearwardly and pull the slide plate rearwardly until the drive member 23 is in a position substantially diametrically opposite that shown in Fig. 3, and the mold opening 14a coincides with the hopper opening 10a.

During this operation of the motor, the cam plate 29 is rotated so that the end of the leg 30a of the linkage member 30 that is attached to the cam plate 29 is moved downwardly. This downward movement applies tension to the springs 31 and thus to the lever 40 to cause rotation of the lever in a counterclockwise direction, as shown in Fig. 4. The rotation of the lever 40 causes rotation of the gears 35, 36, 37 and 38 so that the ram portions 17a move inwardly toward each other and downwardly toward the mold opening 10a. Because of the provision of the springs 31 sufficient pressure is applied to the plastic material at all times irrespective of the amount of resistance encountered in the movement of the feeders. The feeders are always returned to their initial position by the leg 30a abutting against the adjacent end of the bar 32 which acts as a stop member.

After the portion of plastic material has been fed into the mold opening 14a, the mold plate 14 is again moved to the left, as shown in Figs. 1, 3 and 8. As is pointed out above, during this movement the platform 46 and stack 47 of separator sheets 47a are permitted to move upwardly under the urging of spring 51. The topmost sheet on the stack 47 contacts the bottom of the mold adjacent the opening 14a and becomes adhered thereto so that further movement of the mold plate to the position where the mold opening is under the knock-out member 41, presses the top-most sheet against the bottom of the plate and across the bottom of the opening 14a. As soon as this happens, the larger peripheral surface of the cam 55 engages the knob 54a and pushes the arm 54 downwardly, thus drawing the platform 46 and stack 47 away from the mold plate to its initial position.

The above description of the operation of the device shows that either the plastic material or the bottom of the mold plate or both must be adhesive to the separator sheets, at least in the area adjacent the mold opening 14a. This is necessary in order that the separator sheet can be withdrawn from the stack 47. Where the plastic material is ground meat the juices from the meat which immediately coat both the top and bottom surfaces of the mold plate provide the degree of adhesiveness required, and where it is stated in the claims that the mold plate has an adherent surface portion, it is intended to include those instances where ground meat or similar material is molded and the juices or other liquid from the molded material provide the necessary adhesive character. In some instances, however, it will be advisable to provide a separate adherent portion on the bottom of the mold plate immediately forwardly of the mold opening 14a. This is particularly true where other plastic materials than ground meat are being molded. Such alternate constructions are shown in Figs. 9 and 10. In Fig. 9, the adherent material 60 is in the form of a strip of adhesive material such as a sticky tape extending across the bottom of the mold plate, and which may be easily applied and removed when desired. Such a tape may be the ordinary and well known "Scotch tape." In the construction illustrated in Fig. 10 the bottom of the mold plate may be knurled, as indicated at 61, in order to provide the necessary adhesive character to start the withdrawal of the topmost sheet on the stack 47. The invention as set out in the claims is intended to cover all such structures. The separator sheets in the stack 47 may be releasibly retained on the platform 46 in any manner desired. In the structure shown there is employed the well known pins 62 engaging slotted portions of the sheets in the stack 47. Such a construction is an old and well known expedient and is not shown in detail.

As can be seen from the above description, the device of this invention operates continuously to mold patties of plastic materials. After these patties are molded they are ejected from the device in such a manner as to be arranged in a stack. This device which may be used for molding any plastic material is particularly adapted for molding and shaping patties of ground meat such as hamburgers. As all the operating parts of the device are interrelated, the device is simple to construct so that the proper timing is achieved. Thus the mold opening 14a is always aligned with the hopper opening 10a while the feeders 17 are forcing plastic material out the opening 10a. The mold opening 14a is always under the knock-out member 41 during engagement of the actuating member 39 with the notch 29a in the cam plate 29. Similarly, the stack 47 of separator sheets is always pressed upwardly against the mold plate 14 when the mold opening 14a is approaching the knock-out member 41.

The embodiment of the invention shown in Figs. 11 to 13 includes a patty molding device such as is described and claimed in my copending application, Serial No. 284,355, filed April 25, 1952, now U. S. Patent 2,706,830, dated April 26, 1955. The description in this copending application is included here by reference.

In Figs. 11 to 13, the molding apparatus embodiment illustrated therein is adapted to rest on a base 110 such as a table and includes a lower casing 111 provided with a hopper 112. This hopper which is adapted to contain moldable material such as ground meat for making hamburger patties, sausage patties, fish patties and the like is provided with an upwardly flaring open top 112a, a flanged base 112b, outwardly flaring end portions 112c at the bottom thereof and end reinforcing ribs 112d. The flanged base 112b is adapted to be removably attached to the top portion 111a of the casing 111 by winged bolts 113.

Located between the bottom 112b of the hopper 112 and the top 111a of the casing 111 is a substantially horizontal mold plate 115 having a mold opening 115a therein of circular, square or other desired shape. The mold plate is separated from the base 112b of the hopper by an auxiliary plate 116 that is provided with an exit opening 116a therein adapted to communicate with the mold opening 115a so that material may be fed therethrough from the hopper into the mold opening in the customary manner. The mold plate 115 slides within a groove 117a of a second auxiliary plate 117 that rests on top of the casing 111. The provision of the second auxiliary plate 117 permits interchanging mold plates 115 of varying thicknesses and having different sized mold openings 115a so that a patty of a desired predetermined size may be produced.

In order to feed material from the hopper 112 through the opening 116a into the mold opening 115a, there is provided a pair of oscillatable feeders 118 and 119 mounted for oscillation on shafts 120 and 121, respectively. The feeder 118 is provided with a ram portion 118a and the feeder 119 is provided with a similar ram portion 119a. As can be seen in Fig. 12, these ram portions are extended parts of the periphery of the feeders so as to provide a step construction When the feeders are in the position shown in Fig 12 with the ram portions 118a and 119a furthest from the exit opening 116a, the feeders are in position preparatory to forcing material through this exit opening When the feeders have been rotated from the positions shown in Fig 12 to positions adjacent to the opening 116a, they will have exerted pressure on the material within the hopper to force an amount of material through this exit sufficient to fill the mold opening 115a The construction and operation of such a feeding arrangement is described more fully and claimed in my prior Patent 2,530,061, dated November 14, 1950.

In order to operate the molding device of this invention, there is provided a lever 112 that is attached to a shaft 123 for oscillating this shaft. The shaft 123 extends through the front side of the casing 111. This lever 122 has an extension 125 attached thereto at substantially a right angle and rigidly held by a bracket plate 181 so that the molding apparatus may be motor operated.

The motor driven portion of the apparatus in the accompanying drawings includes an electric motor of the usual type (not shown) preferably located beneath the base 110 and driving a worm 126 through a belt 127 that passes over a pulley 128 mounted on the end of the worm shaft 126a. This worm which is held in a mounting 129 drivingly engages a worm gear 130 so that the worm and worm gear combination acts as a speed reducer. The worm gear is mounted on a shaft 131 which is rotatably held in an extension 129a of the mounting 129. As can be seen, rotation of the worm 126 drives the worm gear 130 which in turn drives the shaft 131. This shaft 131 rotates a linkage 132 which carries on its outer end a pin 133 engaging a longitudinal slot 125a in the extension 125. The slot is curved at 125b in order that the apparatus will pause in its movements momentarily at each end of an operational cycle.

Attached to the right hand edge of the lever 122, as viewed in Fig. 11, is a small bracket plate 134 which is adapted to extend beyond the edge of a movable member 135. This member 135 and the lever 122 are normally in a superposed relationship with the member 135 rotatably mounted with respect to the shaft 123. The lower end 135a of the member 135 is provided with a removable pin 136 normally held in a hole in this lower end 135a.

Between the member 135 and the adjacent side of the lower casing 111, there is provided a flat substantially cylindrical casing 137 for a coiled spring (not shown). This spring is an ordinary flat steel spring coiled upon itself and housed within this casing 137. The outer end of this coil spring is attached to the casing 137 while the inner end of the spring is operably attached to the shaft 123. The spring casing 137 is rotatable on shaft 123 and is provided with spaced circularly arranged holes 137a. These holes are provided so that the tension of the spring may be predetermined by engaging the removable pin 136 on the lower end of the movable member 135 with any hole desired. The spring and casing 137 are so arranged that the stress in the spring holds the member 135 against the stop 134 with a predetermined force equivalent to the predetermined stress in the spring. It is, therefore, apparent that the pin 136 holds member 135 and casing 137 for rotation on shaft 123 as a unit and that increased stress may be placed in the spring by locating the pin 136 in succeeding holes 137a.

The upper end of the movable member 135 is provided with a cam follower 138 engaging the curved cam track 139a in an arcuately curved feeder actuating lever 139. The feeder actuating lever 139 has one end attached to the feeder shaft 121 for rotation therewith. This feeder shaft is provided with a circular gear which engages a second similar circular gear 141 on the other feeder shaft 120. The first circular gear is held in place by the feeder actuating lever 139 being fastened to the shaft 121. The second gear 141 and thus the shaft 120 and feeder 119 are held in place by a disc 14a on the shaft 121 and overlapping the second gear 141. This construction greatly simplifies the mounting of the gears, shafts and feeders and makes it much easier to disassemble the machine for cleaning purposes.

As can be seen in Fig. 11 where the apparatus is arranged with the mold plate 115 in completely retracted position and the feeders 118 and 119 are positioned adjacent to the exit 116a, the lever 122 is to the right (Fig. 11) and the cam follower 138 is adjacent to the outer end of the cam track 139a of the feeder actuating lever 139. This cam track is curved downwardly when the apparatus is in this position and movement of the lever 122 to the left (Fig. 11) or toward the opposite position as shown in Fig. 12 causes the mold plate 115 to move to extended position, the spring casing 137 and lever 135 to be rotated in a counterclockwise direction, and the feeder actuating lever 139 also to be rotated toward the position shown in Fig. 12. This rotation of the lever 139 causes the feeders to move toward positions where the ram portions 118a and 119a are furthest from the hopper exit opening 116a. Movement of the lever 122 in the opposite direction tends to move the bracket plate 134 from its abutting relationship with the edge of the movable member 135. However, the stressed spring in casing 137 holds the member 135 against this plate 134, at least initially, to cause the cam follower 138 to rotate the feeder actuating lever 139 in a direction from the position shown in Fig. 12 toward the position shown in Fig. 11. This rotation of the feeder lever 139 rotates the feeders from the position shown in Fig. 12 toward the exit 116a to force plastic material through the hopper exit 116a. Oscillation of the movable member 122 is also used to reciprocate the mold plate 115. This is accomplished by providing a linkage member 143 having one end rotatably attached to the upper end of the member 122 and the opposite end rotatably attached to the outer end of the mold plate 115.

This outer end of the mold plate 115 is provided with a pair of brackets 144 at the edges thereof and extending beyond this end. Extending between the outer ends of these brackets is an axle 145 that is rotatably engaged by the linkage member 143 to reciprocate the mold plate 115. Rotatably mounted on this axle 145 is a holder 146 for a knock-out ring 147 adapted to enter the mold opening 115a and remove material therefrom. This holder 146 which is rotatably mounted on the axle 145 is provided with an extended portion 146a extending toward the hopper 112 with the innermost end of this portion adapted to have the knockout member 147 removably attached thereto as by the bolt 148 and winged nut 149. The opposite end of the member 146 which is mounted on the axle 145 is provided with an outwardly extending flange portion 146b.

In order to raise the removing member or knockout ring 147 to the position shown in Fig. 11, there is provided a toggle joint 150. One end 150a of this toggle joint is rotatably attached to the casing 111 and the other end 150b is rotatable on the axle 145 and located immediately beneath the flange 146b of the knock-out ring holder 146. The toggle joint 150 is so arranged that movement of the mold plate 115 to its retracted position with the mold opening 115a beneath the hopper exit opening 116a raises the toggle ends 150a and 150b. This raising of the toggle end 150b also raises the knock-out ring holder 146 because of the engagement of this toggle end 150b with the flange 146b as shown most clearly in Fig. 11.

In order to retain the knock-out ring 147 and its holder 146 in elevated position, there is provided a catch member 151 rotatably mounted on the linkage member 143 which moves the mold plate 115. This catch member is mounted for rotation about a bolt 152 and is so proportioned that the heavy end of the catch member is beyond this bolt resting on top of the flange 146b. The catch member 151 is provided with a cut away catch portion so positioned that it drops down behind the knock-out ring holder flange 146b when this flange has reached the position shown in Fig. 11 so that the holder and ring are in inoperative position and cannot fall when the mold plate starts to move in its opposite direction. With this movement the flange 146b is released by the toggle joint end 150b.

In order to disengage the catch member 151 from the flange 146b and permit the knock-out ring 147 to fall downwardly and knock the material from within the mold opening 115a, there is provided a knock-out pin 153 at the hinged connection of the toggle joint 150. This knock-out pin 153 is adapted to engage the light end of the catch member 151 beyond its pivot bolt 152 and rotate the catch member 151 in a clockwise direction as shown in Fig. 11 in order that the flange 146b will be released. As soon as this flange is released, the knock-out ring holder 146 and thus the ring 147 falls forwardly so that the ring enters the opening 115a to knock molded material therefrom. The parts are so arranged that this action occurs when the mold opening has been moved from the first position illustrated in Fig. 11 where it receives material from the hopper to its second position illustrated in Fig. 12 where the mold material is removed from the opening.

In order to accelerate the downward movement of the knock-out ring 147 and thus give the material within the mold opening 115a a sharp rap so that the material will be removed cleanly, there is provided a helical tension spring 154 extending between a post 155 on the flange 146b and a post 155a on the toggle end 150b adjacent the toggle joint 150c. With this arrangement the movement of the toggle joint toward a position where the toggle ends are in alignment places increased tension on the spring 154. Therefore, at the moment when the catch member releases the ring holder, the spring is under its maximum tension and the knock-out ring is snapped sharply downwardly to remove the molded material from the opening 115a.

In the embodiment shown in Figs. 11, 12 and 13 the worm shaft 126a is extended to the exterior of the device and has mounted thereon a pulley 160 for rotation therewith. This end of the shaft 126a is held in a bracket 161 located just inwardly of the pulley 160.

Located rearwardly of the pulley 160 and aligned therewith is a second pulley 162 mounted on a shaft 163 for rotation of this shaft. The opposite ends of this shaft are held in a bracket 164 having upwardly extending supporting end portions 164a and 164b. Extending between the pulleys 160 and 162 is a driving belt 165.

Mounted on the shaft 163 between the second pulley 162 and the bracket end portion 164b there is positioned a driving cylinder 166 for driving a conveyor belt 167. The conveyor belt extends from the cylinder 166 forwardly to another similar cylinder which acts as an idler, with this cylinder being held on a shaft similar to the shaft 163 and in a bracket similar to the bracket 164. This second cylinder shaft and bracket are not shown but function in the ordinary manner and may be located at any point desired forwardly of the device in the manner illustrated in Fig. 13.

During operation of the molding device the driving belt 127 serves to drive the shaft 126a. This rotation of the shaft 126a causes movement of the conveyor belt 165 in the direction indicated by the arrow in Fig. 13. As the upper reach 165a of the belt 165 moves forwardly, separator sheets 168 may be placed thereon at spaced intervals by hand or by any suitable mechanical means. Then as the patties are ejected from the mold opening 115a in the mold plate 115 by the knock-out ring 147 and associated mechanism, these patties 169 fall upon the separator sheets 168 with each patty resting upon an individual sheet. The patties are then removed from the conveyor belt 167 forwardly of the knock-out position by hand or by any other means desired.

With the molding apparatus in the position shown in Fig. 11 and the hopper 112 full of ground meat or other moldable material and the mold opening 115a also full of moldable material, operation of the device through one cycle is as follows:

Movement of the member 122 in a counterclockwise direction as viewed in Fig. 11 causes similar movement of member 135 because of the engagement of plate 134 therewith. This movement of member 135 also causes the feeder actuating lever 139 to be rotated in a counterclockwise direction because of the engagement of cam follower 138 with cam track 139a. The movement of the member 122 in a counterclockwise direction also moves the mold plate 115 from its retracted position to its extended position as shown in Fig. 12. As explained above, the knock-out ring 147 and its holder 146 have already been moved to their uppermost positions and are retained in this position by the catch member 151 until the plate has approached its fully extended position. At this time the catch member 151 is moved from engagement with the holder 146 so that the ring 147 falls into the mold opening 115a and removes the patty therefrom, all as explained in greater detail above.

With the mold plate in fully extended position and the movable operating member 122 moved forwardly through one-half of its oscillation cycle, movement of this member in the opposite direction or from the position shown in Fig. 12 to the position shown in Fig. 11 moves the oscillatable member 122 and thus the bracket plate 134 rearwardly. The stress in the spring within the housing 137 holds the member 135 against the bracket 134 during at least the initial portion of this rearward movement. However, when the feeders 118 and 119 meet sufficient resistance within the hopper 112, the bracket plate 134 will move away from the spring urged member 135 leaving the full force of the spring to be exerted through the housing 137, member 135, lever 139 and axles 120 and 121 to the feeders 118 and 119. The force exerted by the feeders against this resistance within the hopper will depend upon the initial tension set up in the coil spring. As was pointed out above, this tension is regulated by the particular hole 137a in which the pin 136 is placed. Where the material to be molded is relatively fluid, this tension will be correspondingly light so that the fluid material will not be forced out the bottom of the hopper around the joints therein. Conversely when the material is relatively stiff and less fluid, the tension in spring will be correspondingly greater. It is to be understood, of course, that when the bracket plate 134 moves away from the member 135, this movement itself sets up some additional force in the spring as the inner end of the spring is attached to the axle 123.

Movement of the member 122 in this direction also moves the mold plate 115 from its extended to its retracted position shown in Fig. 11 and simultaneously raises the knock-out ring and its holder 146 from the positions shown in Fig. 12 to the elevated positions shown in Fig. 11. Once again the catch member 151 drops into place to engage the flange 146b and hold the knock-out ring in elevated position.

As can be seen by the description herein of the invention, the device of this invention shapes the patty in its final form in the mold plate 115 and the shape or formed patty is then removed from the device without substantial further shaping of the patty.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. In a device for molding a patty from plastic material, apparatus comprising: a mounting means; a source of plastic material operatively carried by the mounting means having an exit therefrom; a mold movable relative to said exit operatively carried by the mounting means including a shaping cavity having substantially the shape and dimensions of said patty for shaping the patty in its final form; apparatus operatively carried by the mounting means and operatively engaging the mold for moving the mold until the cavity is in communication with the exit to receive material therefrom and then moving the mold to a discharge position spaced from said exit; apparatus operatively carried by the mounting means and automatically operable when said mold reaches said discharge position for removing the formed patty from said shaping cavity and from the device without substantial further shaping of said patty; apparatus associated with said mounting means for operatively supporting a separator sheet adjacent to said device; and apparatus operatively carried by the mounting means for supplying said separator sheet to said patty.

2. In a device for molding a patty from plastic material, apparatus comprising: a mounting means, a hopper for the plastic material operatively carried by the mounting means; a movable mold operatively carried by the mounting means adjacent to the hopper including a mold opening having substantially the shape and dimensions of said patty for shaping the patty in its final form; apparatus operatively carried by the mounting means engaging the mold for moving the mold relative to the hopper from a position where the mold opening is in communication with the hopper to receive plastic material therefrom to a discharge position where the opening is spaced from said hopper; apparatus operatively carried by the mounting means located adjacent to the discharge position of the mold and automatically operable when said mold reaches said discharge position for removing the formed patty from the mold opening; apparatus associated with said mounting means for operatively supporting a separator sheet adjacent to said device; and apparatus operatively carried by the mounting means for supplying said separator sheet to said patty.

3. In a device for molding a patty from plastic material, apparatus comprising: a mounting means; a hopper for the plastic material operatively carried by the mounting means; a reciprocable mold plate operatively carried by the mounting means adjacent to the hopper including a mold opening having substantially the shape and dimensions of said patty for shaping the patty in its final form; apparatus operatively carried by the mounting means engaging the mold plate for moving the mold plate relative to the hopper from a position where the mold opening is in communication with the hopper to receive plastic material therefrom to a discharge position where the opening is spaced from said hopper; apparatus operatively carried by the mounting means located adjacent to the discharge position of the mold plate and automatically operable when said mold reaches said discharge position for engaging said patty in said opening and removing the formed patty from the mold opening; apparatus associated with said mounting means for operatively supporting a separator sheet adjacent to said device; and apparatus operatively carried by the mounting means for supplying said separator sheet to said patty.

4. In a device for molding a patty from plastic material, apparatus comprising: a mounting means; a hopper for the plastic material operatively carried by the mounting means; molding apparatus operatively carried by the mounting means and located adjacent to the hopper for receiving a portion of material from the hopper, the molding apparatus having a material receiving mold cavity of substantially the shape and dimensions of said patty for shaping the patty in its final form; apparatus operatively carried by the mounting means adjacent to the molding apparatus and automatically operable when said mold reaches said discharge position for removing said patty from the cavity and from said device without substantial further shaping of the patty; apparatus associated with said mounting means for operatively supporting a separator sheet adjacent to said device; and apparatus operatively carried by the mounting means for supplying said separator sheet to said patty.

5. In a device for molding a patty from plastic material, apparatus comprising: a mounting means; a hopper for the plastic material operatively carried by the mounting means; a movable mold operatively carried by the mounting means adjacent to the hopper including a mold opening having substantially the shape and dimensions of said patty for shaping the patty in its final form; apparatus operatively carried by the mounting means engaging the mold for moving the mold relative to the hopper from a position where the mold opening is in communication with the hopper to receive plastic material therefrom to a discharge position where the opening is spaced from said hopper; apparatus operatively carried by the mounting means located adjacent to the discharge position of the mold and automatically operable when said mold reaches said discharge position for removing the formed patty from the mold opening; a supporting member adjacent to said discharge position for receiving said patty, the supporting member being adapted releasably to support a separator sheet for said patty; and apparatus operatively carried by the mounting means for automatically supplying said separator sheet to said supporting member.

6. In a device for molding a patty from plastic material, apparatus comprising: a mounting means; a hopper for the plastic material operatively carried by the mounting means; a reciprocable mold plate operatively carried by the mounting means adjacent to the hopper including a mold opening having substantially the shape and dimensions of said patty for shaping the patty in its final form; apparatus operatively carried by the mounting means engaging the mold plate for moving the mold plate relative to the hopper from a position where the mold opening is in communication with the hopper to receive plastic material therefrom to a discharge position where the opening is spaced from said hopper; apparatus operatively carried by the mounting means located adjacent to the discharge position of the mold plate and automatically operable when said mold reaches said discharge position for engaging said patty in said opening and removing the formed patty from the mold opening; a supporting member adjacent to said discharge position for receiving said patty, the supporting member being adapted releasably to support a separator sheet for said patty; and apparatus operatively carried by the mounting means for automatically supplying said separator sheet to said supporting member.

7. In a device for molding a patty from plastic material, apparatus comprising: a mounting means; a hopper for the plastic material operatively carried by the mounting means; a reciprocable mold plate operatively carried by the mounting means adjacent to the hopper including a mold opening having substantially the shape and dimensions of said patty for shaping the patty in its final form; apparatus operatively carried by the mounting means engaging the mold plate for moving the mold plate relative to the hopper from a position where the mold opening is in communication with the hopper to receive plastic material therefrom to a discharge position where the opening is spaced from said hopper; a knock-out member operatively carried by the mounting means adjacent to the discharge position of the mold plate; apparatus operatively carried by the mounting means operatively engaging the knock-out member for causing the member to enter said opening and remove the formed patty therefrom when the plate has reached said discharge position; apparatus associated with said mounting means for operatively supporting a separator sheet adjacent to said device; and apparatus operatively carried by the mounting means for supplying said separator sheet to said patty.

8. In a device for molding a patty from plastic material, apparatus comprising: a mounting means; a hopper for the plastic material operatively carried by the mounting means; a reciprocable mold plate operatively carried by the mounting means adjacent to the hopper including a mold opening having substantially the shape and dimensions of said patty for shaping the patty in its final form; apparatus operatively carried by the mounting means engaging the mold plate for moving the mold plate relative to the hopper from a position where the mold opening is in communication with the hopper to receive plastic material therefrom to a discharge position where the opening is spaced from said hopper; a knock-out member operatively carried by the mounting means adjacent to the discharge position of the mold plate; apparatus operatively carried by the mounting means operatively engaging the knock-out member for causing the member to enter said opening and remove the formed patty therefrom when the plate has reached said discharge position; a supporting member adjacent to said discharge position for receiving said patty, the supporting member being adapted releasably to support a separator sheet for said patty; and apparatus operatively carried by the mounting means for automatically supplying said separator sheet to said supporting member.

References Cited in the file of this patent

UNITED STATES PATENTS

| Number | Name | Date |
|---|---|---|
| 1,987,029 | Shelgren | Jan. 8, 1935 |
| 2,413,046 | Holly | Dec. 24, 1946 |
| 2,530,062 | Holly | Nov. 14, 1950 |